United States Patent Office.

AUGUSTUS SCHELLER, OF NEW YORK, N. Y.

Letters Patent No. 63,949, dated April 16, 1867.

IMPROVED PROCESS OF WHITENING HORN.

The Schedule referred to in these Letters Patent and making part of the same.

TO ALL WHOM IT MAY CONCERN:

Be it known that I, AUGUSTUS SCHELLER, of No. 102 Forsyth street, in the city, county, and State of New York, have invented a new and improved Process for Whitening Horn and other similar substances; and I do hereby declare that the following is a full, clear, and exact description thereof, which will enable those skilled in the art to make and use the same.

This invention consists in treating horn or other substances of a similar nature first with acetate of lead, nitrate of lead, or any other soluble salt, or oxide of lead, and afterwards with dilute muriatic acid, in such a manner that by the action of the lead the sulphur contained in the horn or other similar substance is transformed into sulphuret of lead, which by being brought in contact with muriatic acid is converted into chloride of lead, and thereby a pure white color is imparted to the horn or other substance of a similar nature.

In carrying out my process I take the horn or other similar substance, and clean it carefully from all adhering impurities. I then make a solution of one pound of crystallized white acetate of lead, or of an equivalent quantity of another soluble salt or oxide of lead, in three pounds of pure water at a temperature of 100°. After this solution has perfectly cleared itself, the horn or other substance is immersed therein, the liquid being kept at a moderate heat, and allowed to remain in the same until it has assumed a uniform black color, which is produced by the formation of sulphuret of lead. Then the horn is removed from the solution, rinsed in pure cold water until all the particles of the lead salt adhering to it are washed off, and finally inserted in a sufficient quantity of diluted muriatic acid, one pound of strong muriatic acid of 1.16 grains to three pounds of pure water. In this acidulated water the horn is kept in a moderately warm place until the black color has entirely disappeared and a pure white color covers the whole surface of the horn, this color being produced by the formation of chloride of lead. On being removed from the acid the horn is repeatedly rinsed in pure cold water, which is permitted to drain off, and the horn is slowly dried in a moderately warm room.

What I claim as new, and desire to secure by Letters Patent, is—

The within-described process of whitening horn or other similar substances by treating with acetate of lead or any other soluble salt or oxide of lead, and with muriatic acid, substantially in the manner set forth.

This specification signed by me this 15th day of February, 1867.

AUGUSTUS SCHELLER.

Witnesses:
W. HAUFF,
GEO. F. SOUTHERN.